United States Patent [19]

Boyd et al.

[11] Patent Number: 5,195,746
[45] Date of Patent: Mar. 23, 1993

[54] VIDEO DISPLAY CONTROL APPARATUS

[75] Inventors: Cecil E. Boyd; Terry N. Tessmer; Kenneth F. Dwyer, all of Neosho, Mo.; Glen E. Thomas, Grove, Okla.

[73] Assignee: Simulator Technology, Inc., Neosho, Mo.

[21] Appl. No.: 680,584

[22] Filed: Apr. 4, 1991

[51] Int. Cl.⁵ .................... A63B 71/04; A63F 9/22; G09B 9/02
[52] U.S. Cl. .............................. 273/148 B; 273/438; 273/313; 434/29
[58] Field of Search ................ 273/148 B, 438, 313, 273/316; 434/29, 45, 62; 272/73, 97, 129

[56] References Cited

U.S. PATENT DOCUMENTS 4,461,470 7/1984 Astroth et al. .
4,512,567 4/1985 Phillips .
4,711,447 12/1987 Mansfield .
4,817,950 4/1989 Goo .

OTHER PUBLICATIONS

Power 10 Hotseat, "Playthings" Magazine, Dec. 1990, p. 39.

Primary Examiner—V. Millin
Assistant Examiner—Raleigh W. Chiu
Attorney, Agent, or Firm—Richard L. Schwartz; W. Kirk McCord

[57] ABSTRACT

Apparatus for controlling the movement of an electronic image on a video display includes a base member, a seat for an operator, a support assembly for mounting the seat on the base member in facing relation to the video display, such that the seat can be tilted relative to the base member. Two handles project upwardly from the base member, adjacent respective opposed sides of the seat for being grasped by the operator in the seat to impart tilting movement thereto by shifting the weight of the operator in a direction corresponding to a desired directional movement of the image. A plurality of electrical switches are provided for sensing the tilting movement of the seat and for generating an electrical signal indicative thereof. Video game control circuitry is responsive to the discrete electrical signal for moving the electronic image in response to the tilting movement of the seat. The apparatus is particularly well-suited for use in connection with a flight simulation video game, whereby the video display is used to simulate the movements of an aircraft and the sensations experienced by an aircraft pilot during various movements of the aircraft.

23 Claims, 5 Drawing Sheets

VIDEO DISPLAY CONTROL APPARATUS

FIELD OF THE INVENTION

This invention relates generally to video games and displays and in particular to apparatus for controlling the movement of an electronic image on a video display terminal, such as a video game display terminal.

BACKGROUND OF THE INVENTION

Video displays, such as those associated with electronic video games, are typically controlled by user-operable switches, located on or adjacent a console which houses the video display. The switches may include a switch for selecting a particular video game to be played and one or more switches for controlling various game parameters. A user-controllable joystick may also be provided to allow the user to move all or a portion of the electronic image, thereby adding realism to the game.

DESCRIPTION OF THE PRIOR ART

It is known in the art to adapt an exercise apparatus, such as a stationary bicycle, for controlling a video game display. For example, in U.S. Pat. No. 4,512,567, a video game character is moved in either direction along a first lateral axis (i.e., the "X" axis) of the display in response to the lateral movement of the handlebars of a stationary bicycle and is moved in either direction along a second lateral axis (i.e., the "Y" axis) of the display, which is perpendicular to the first lateral axis, in response to the up and down tilting movement of the handlebars. U S. Pat. No. 4,711,447 discloses an exercise apparatus for controlling a video game character, which includes a seat for the operator and handlebars and pedals adjacent to the seat. The chair is rotated in one direction by pumping the pedals in a forward motion and in an opposite direction by pumping the pedals in a backward motion, and is tilted forward and backward by respectively pulling and pushing on the handlebars.

Apparatus for simulating on a video display the movement of a platform on which a user is supported is also known in the art. For example, in U.S. Pat. No. 4,817,950, a surfing video game in which a surfing figure moves over simulated waves is controlled by a foot-actuated surfboard simulator. In U.S. Pat. No. 4,461,470, realism is added to the playing of a video game by tilting a platform on which the user is seated in a direction opposite from the tilting movement of the video game display. The user operates a joystick on the video game console to control the movement of both the platform and the display.

SUMMARY OF THE INVENTION

These and other objects are accomplished in accordance with the present invention wherein apparatus in provided for controlling an electronic image on a video display. The apparatus includes a base member, a seat for an operator, support means for mounting the seat on the base member in facing relation to the display, such that the seat can be tilted relative to the base member by the operator's shifting his weight in a direction corresponding to a desired direction of movement of the image; and means responsive to the tilting movement of the seat for controlling the movement of the image accordingly.

In accordance with one unique feature of the invention the support means includes a socket member located on a bottom part of the seat; a housing located on the base member; a shaft extending through a top portion of the housing for engaging the socket member to mount the seat on the base member, such that the tilting movement of the seat is imparted to the shaft; a resilient member concentrically disposed on the shaft within the housing for opposing the tilting movement of the shaft; and means located in the housing for limiting the tilting movement of the shaft and seat. The resilient member is deformable in response to a force imparting tilting movement to the shaft and is sufficiently resilient to return to a non-deformed state in the absence of the tilting force to urge the shaft and seat to a position of equilibrium. In one embodiment, a portion of the resilient member is beveled to provide a space within the housing for accommodating the deformation of the resilient member in response to the tilting movement of the shaft and seat.

In accordance with yet another unique feature of the invention, the means for controlling the movement of the display includes electrical switch means responsive to a direction of tilt of the seat for generating an electrical signal indicative thereof and computing means responsive to the electrical signal for moving the image accordingly. In one embodiment the switch means includes a plurality of switches located with respect to the support means, such that the tilting movement of the seat closes at least one of the switches. A discrete electrical signal is generated in response to the closure of each switch. The direction of tilt is indicated by the closure of a particular one or ones of the switches.

In the preferred embodiment, the apparatus is used to control an image on a video game display. Two handles extend upwardly from the base member on opposite sides of the seat, whereby the operator can impart tilting movement to the seat in any direction by selectively pulling on and pushing against one or both of the handles, to shift the operator's weight in the desired tilting direction. Each of the switches includes an actuator member, which is biased toward an open switch position. The actuator member of each switch is movable to a closed switch position by pressure contact thereon, to close the corresponding switch.

DETAILED DESCRIPTION OF THE PREFERRED EMBODIMENT

In the description which follows, like parts are marked throughout the specification and the drawings with the same reference numerals, respectively. The drawings are not necessarily to scale and proportions of certain parts may have been exaggerated for purposes of clarity.

Figure 1A:
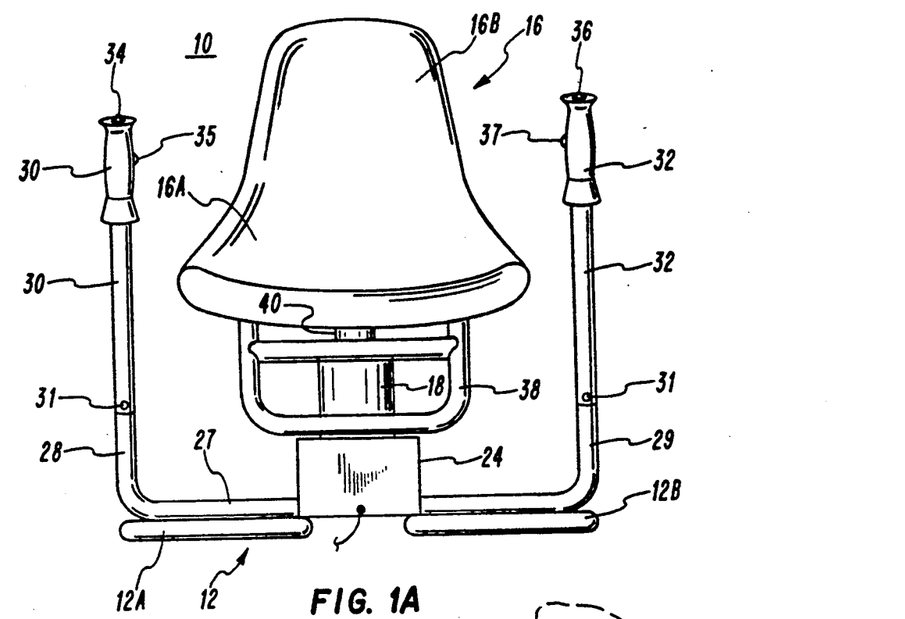
FIGS. 1A, 1B and 1C are respective front elevation, side elevation and perspective views of a video game console and apparatus for controlling a video game, according to the present invention.
Figure 1B:
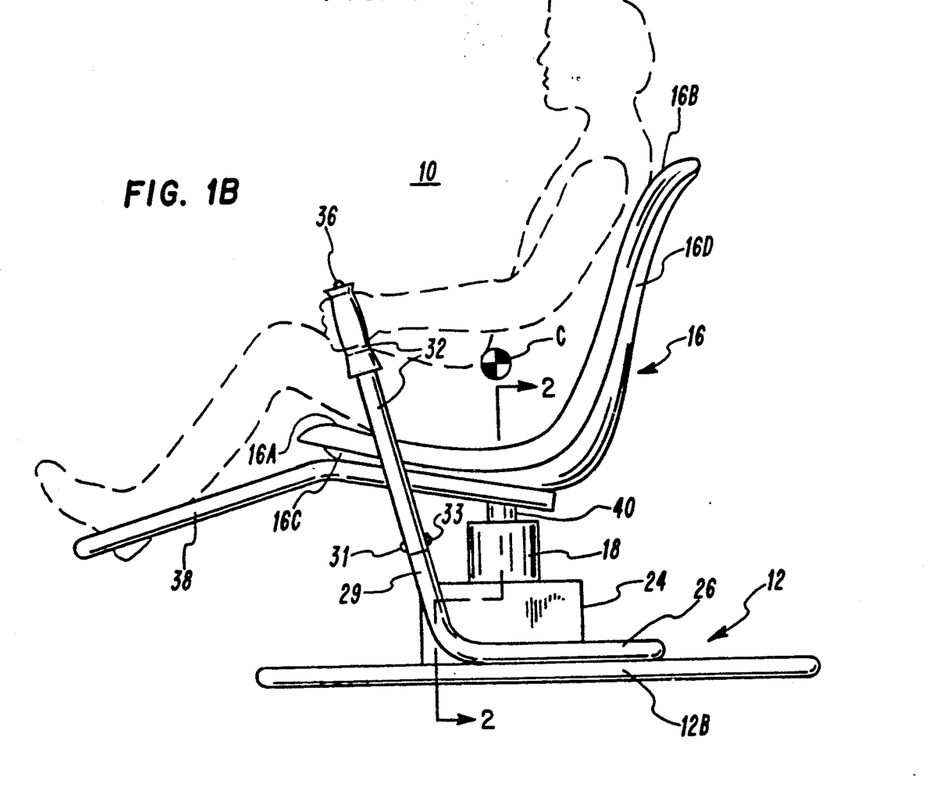
Figure 1C:
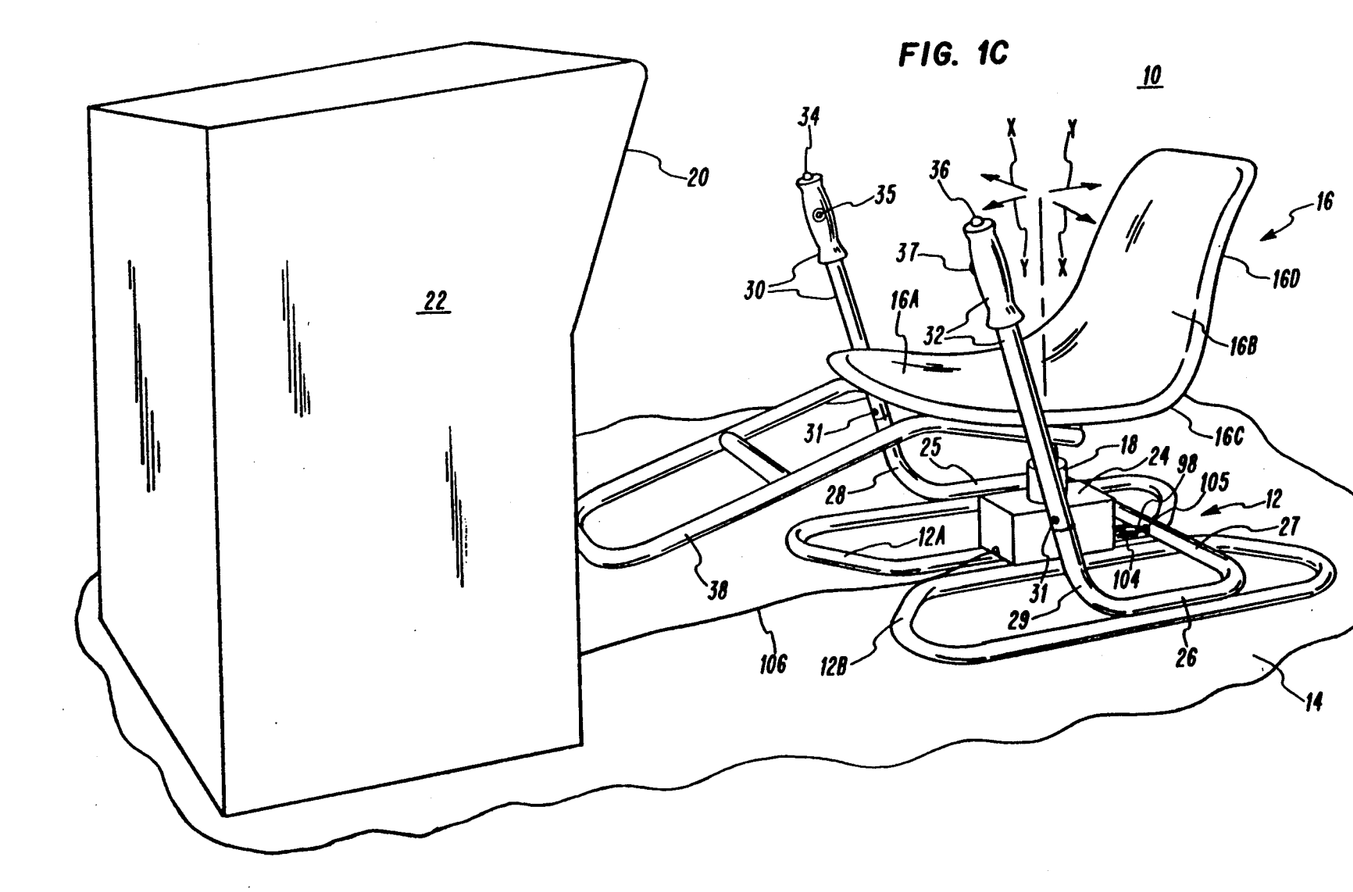

Referring to FIGS. 1A, 1B and 1C, apparatus 10 for controlling the operation of a video game includes a base member 12 for being positioned on a relatively flat support surface 14, a seat 16 for accommodating an operator, a support assembly 18 located beneath seat 16 for mounting seat 16 on base member 12 in facing relation to a video display 20 housed in a top portion of a video game console 22, and a control module 24 located beneath support assembly 18. Base member 12 includes first and second tubular members 12A and 12B defining respective closed loops. Two longitudinally extending tubular members 25 and 26 are mounted on respective opposed sides of base member 12. A transversely extending tubular member 27 extends between tubular members 25 and 26. Two arms 28 and 29 depend from respective tubular members 25 and 26. Handles 30 and 32 are attached to respective arms 28 and 29 by respective bolts 31 and nuts 33. Manually-operable switches 34 and 35 are located on handle 30 and manually-operable switches 36 and 37 are located on handle 32, for allowing the operator to control selected parameters of the video game.

Seat 16 has a generally horizontal inner surface 16A on which the operator sits, a generally vertical inner surface 16B for back support, a generally horizontal outer surface 16C and a generally vertical outer surface 16D. A foot support member 38 is secured to outer surface 16C of seat and projects from beneath seat 16 in the direction of console 22, for elevating the operator's feet above base member 12, such that when the operator is seated in seat 16, his weight is substantially completely supported by support assembly 18.

Figure 2:
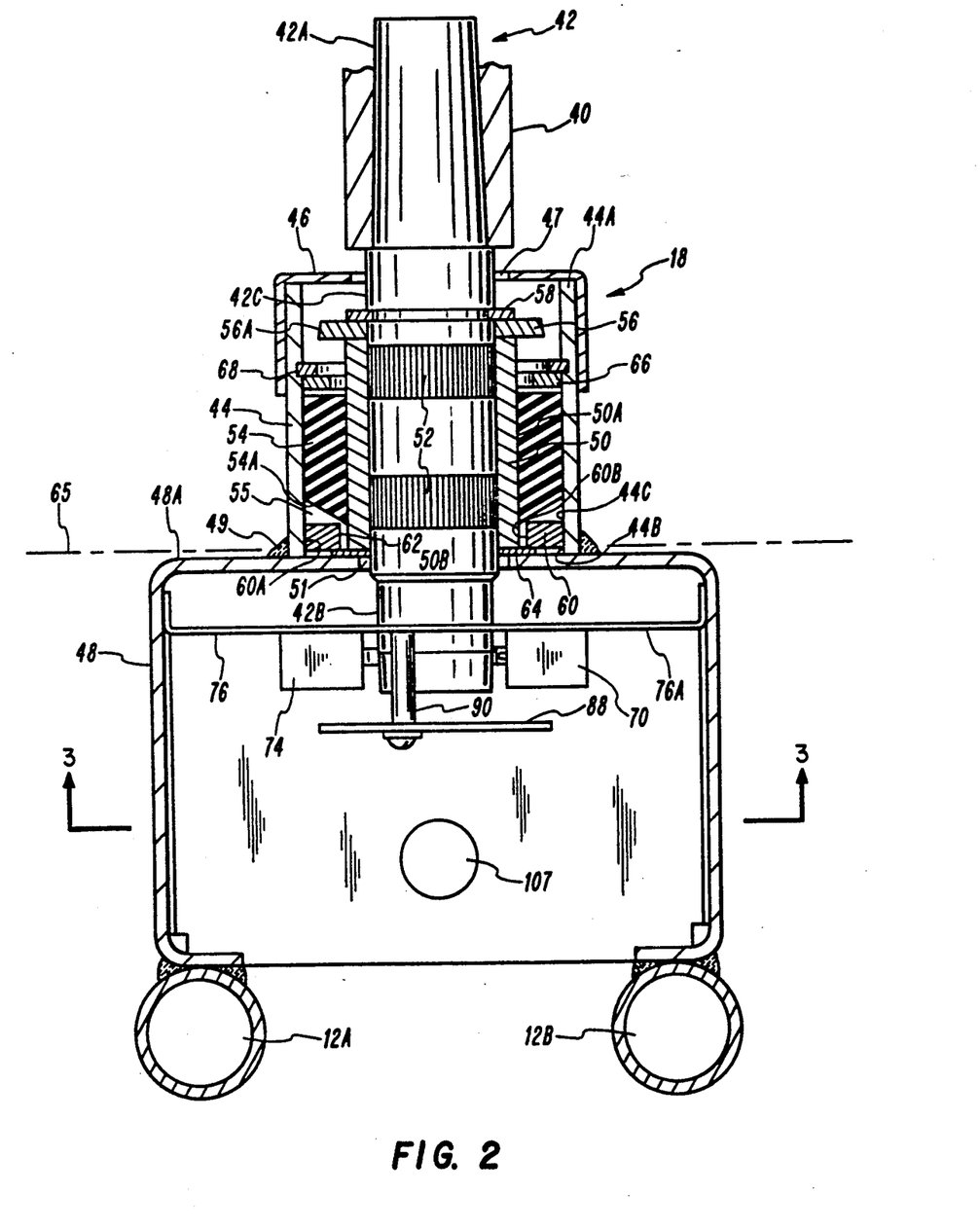
FIG. 2 is a sectional view of the video game control apparatus of FIG. 1, taken along the line 2—2 in FIG. 1B.

Referring also to FIG. 2, support assembly 18 includes a cylindrically-shaped socket member 40 preferably located on outer horizontal surface 16C of seat 16, for receiving an upper portion 42A of a cylindrical shaft 42, which extends above a cylindrical housing 44. Upper portion 42A is tapered upwardly for press-fit mating engagement with socket member 40, as can be best seen in FIG. 2. A cylindrical cover member 46 having a central opening 47 fits over a top portion 44A of housing 44, such that upper portion 42A of shaft 42 extends through central opening 47. Housing 44 is attached at lower portion 44B thereof to a control module housing 48 by welding, as indicated by weldment 49. A top part 48A of housing 48 is formed having a central opening 51 through which a lower portion 42B of shaft 42 extends. A central portion 42C of shaft 42 is disposed within housing 44. Central portion 42C is enlarged with respect to upper portion 42A and lower portion 42B.

A cylindrical metal sleeve 50 is press-fit onto central portion 42C of shaft 42 for co-movement with shaft 42. Shaft 42 and sleeve 50 are mounted for lateral tilting movement with respect to housing 44 as described more fully below. Portions of shaft 42 are knurled, as indicated at 52, to enhance the gripping engagement between sleeve 50 and shaft 42. A resilient member 54 is interposed between sleeve 50 and an inner wall 44C of housing 44. The resilient member 54 surrounds substantially the entire perimeter of sleeve 50, for opposing the tilting movement of shaft 42 and sleeve 50 with respect to housing 44. Resilient member 54 is comprised of a relatively high durometer rubber material which is deformable in response to a force imparting the tilting movement to shaft 42 and sleeve 50 and is sufficiently resilient to return to a non-deformed state in the absence of the tilting force to urge shaft 42 and sleeve 50 to a non-tilted, upright position, as depicted in FIG. 2, which corresponds to a position of equilibrium of shaft 42 and seat 16. A lower portion of resilient member 54 is formed having a beveled surface to provide a space 55 to accommodate the deformation of resilient member 54 resulting from the tilting movement of shaft 42 in any direction. Shaft 42 and sleeve 50 are thus positioned within the housing 44 as located by the resilient member 54 for resilient, tilting, pivotal movement with respect to housing 44.

Seat 16 is mounted on support assembly 18, such that the center of gravity of seat 16, with foot support member 38 secured thereto, is substantially directly above support assembly 18. Seat 16 and foot support member 38 are thus maintained in a balanced position of equilibrium. When the operator is seated in seat 16, the operator's weight C is also centered substantially directly above support assembly 18, so that seat 16, with the operator seated therein, is maintained in a balanced position of equilibrium, until the operator purposely shifts his weight to tilt seat 16.

An upper stop member 56 is concentrically disposed on central portion 42C of shaft 42 for engaging inner wall 44C of housing 44, to limit the side-to-side tilting movement of shaft 42. Peripheral surface 56A of stop member 56 is slightly beveled, such that when shaft 42 is tilted to its maximum limit, peripheral surface 56A will be substantially in parallel alignment with inner wall 44C. A retainer ring 58 is snap-fit into a groove in shaft 42, to retain stop member 56 in a substantially fixed position on shaft 42.

A lower stop member 60 is concentrically disposed about sleeve 50, beneath resilient member 54. Stop member 60 is press-fit into housing 44, such that an outer annular surface 60A of stop member 60 is in pressure engagement with inner wall 44C. A small clearance 62 on the order of approximately 0.14 inch is maintained between an inner surface 60B of stop member 60 and an outer wall 50A of sleeve 50 to permit shaft 42 to be tilted with respect to the housing 44. The tilting movement of shaft 42 is arrested when outer wall 50A of sleeve 50 engages inner surface 60B of stop member 60. A thrust washer 64 is sandwiched between a lower surface 50B of sleeve 50 and external top surface 48A of control module housing 48 for supporting and distributing the weight acting along a longitudinal axis of shaft 42. Thrust washer 64 prevents lower surface 50B of sleeve 50 from bearing directly on external top surface 48A. A transverse axis 65 extending along a boundary between stop member 60 and thrust washer 64 defines an approximate pivot axis of shaft 42 when shaft 42 is tilted, such that lower portion 42B of shaft 42 will move in an opposite direction from upper portion 42A and central portion 42C when shaft 42 is tilted.

As shown in FIG. 2, resilient member 54 is located between lower stop member 60 and a retainer washer 66. A retainer ring 68 is snap fit into an annular groove in inner wall 44C for constraining the axial movement of washer 66 and resilient member 54 in an upward direction. Stop member 60 constrains the axial movement of resilient member 54 in a downward direction and also cooperates with resilient member 54 to stabilize shaft 42 in a substantially upright position of equilibrium, as depicted in FIG. 2, in the absence of a tilting force on shaft 42.

Figure 3:
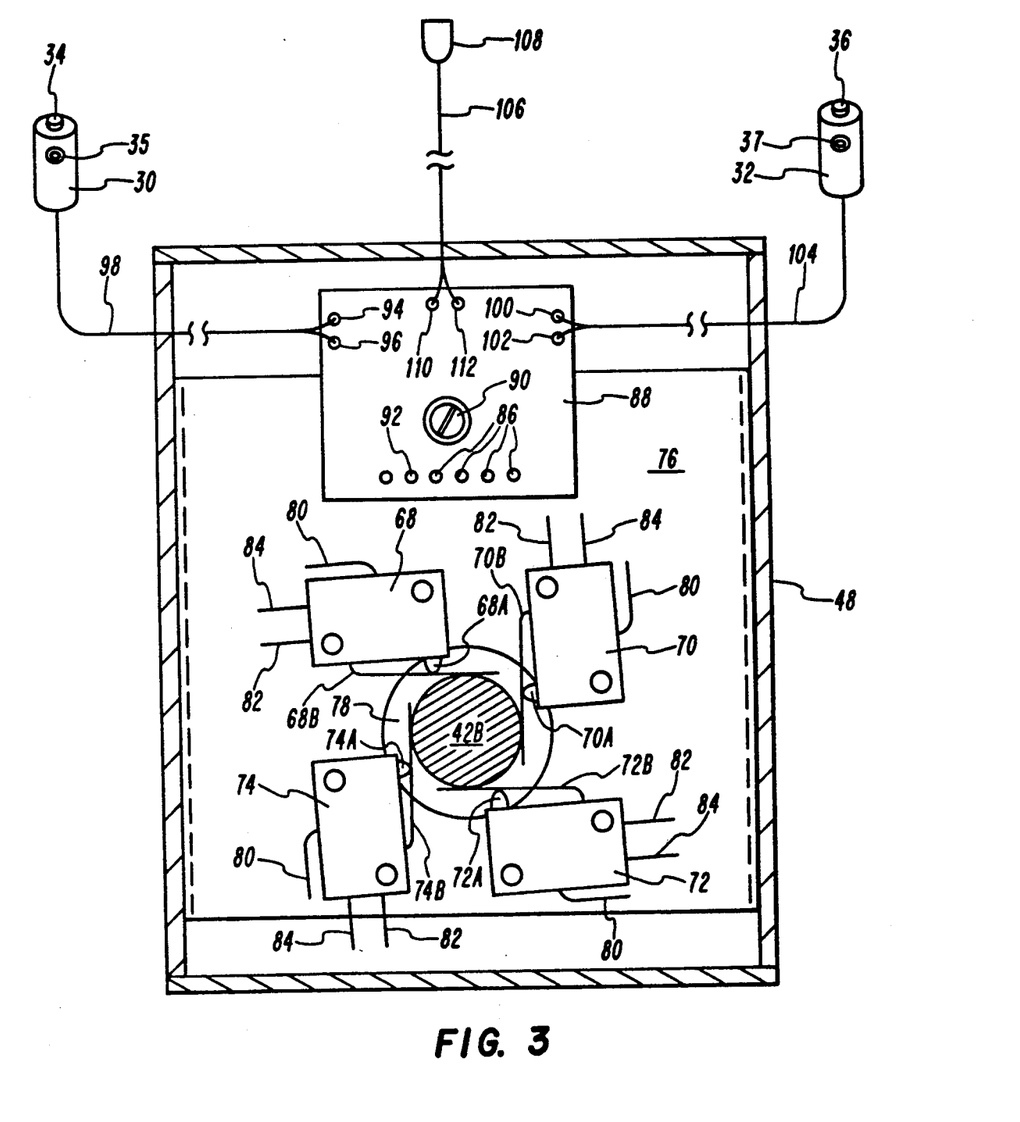
FIG. 3 is a bottom plan view of the video control apparatus of FIG. 1, from the viewing plane indicated by the line 3—3 in FIG. 2.
Figure 4:
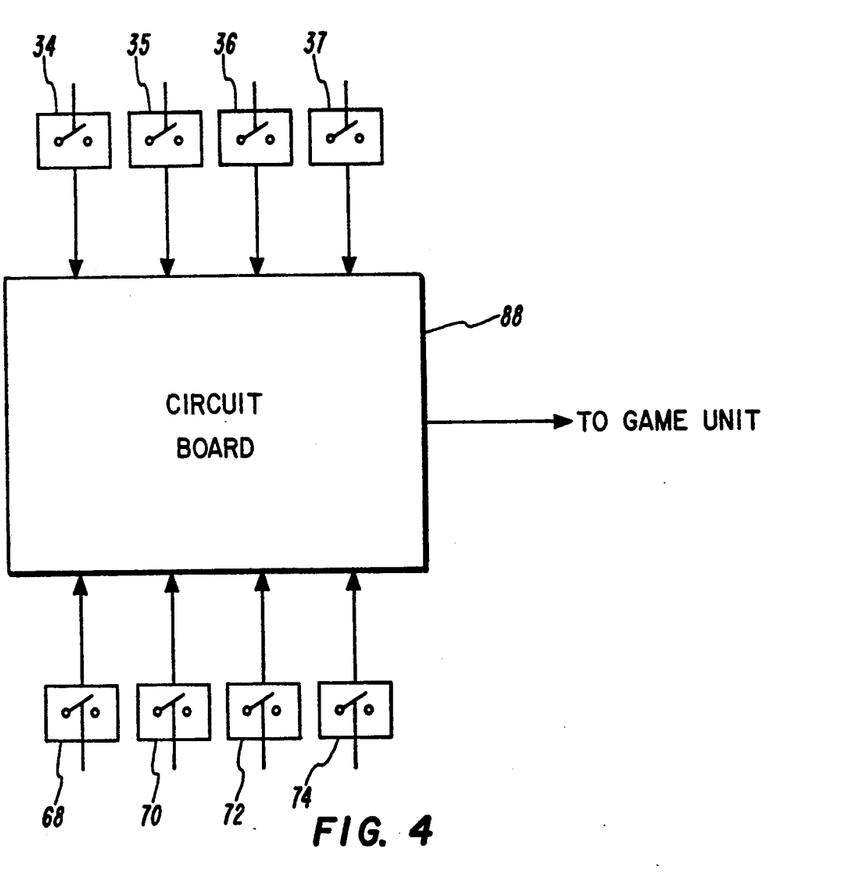
FIG. 4 is an electrical schematic diagram of the control apparatus.

Referring to FIGS. 2 and 3, four electrical switches 68, 70, 72 and 74 are mounted on a bottom major surface 76A of a mounting plate 76, which is located within housing 48. Lower end 42B of shaft 42 extends through central opening 51 in top surface 48A of housing 48 and also through a central opening 78 in mounting plate 76, as can be best seen in FIG. 2. Each of the switches 68, 70, 72 and 74 is a self-contained modular switch having a corresponding "snap action" switch closure member 68A, 70A, 72A and 74A, which is spring-biased to an open switch position, as depicted in FIG. 3. Actuator arms 68B, 70B, 72B and 74B are in contact with the respective closure members 68A, 70A, 72A and 74A for depressing same in response to pressure contact from lower end 42B of shaft 42 on the corresponding actuator arms 68B, 70B, 72B and 74B when shaft 42 is tilted.

Opposed actuator arms 68B and 72B are oriented in substantially parallel relationship, such that distal end portions of actuator arms 68B and 72B are substantially tangent to the perimeter of shaft 42 when shaft 42 is upright. Similarly, opposed actuator arms 70B and 74B are oriented in substantially parallel relationship, with respectively distal portions of actuator arms 70B and 74B also being substantially tangent to the perimeter of shaft 42 when shaft 42 is upright. As depicted in FIG. 3, actuator arms 70B and 74B are oriented substantially perpendicular to actuator arms 68B and 72B. In this configuration, one or two of the actuator arms 68B, 70B, 72B, 74B are engaged by lower portion 42B of shaft 42 when shaft 42 is tilted in any direction. The particular one or ones of the actuator arms 68B, 70B, 72B, 74B which are contacted by lower portion 42B is dependent upon the direction of tilt of shaft 42.

Actuator arms 68B and 72B are oriented to detect fore and aft tilting movement of shaft 42 (i.e., along the Y-axis of FIG. 1C), which is translated into corresponding movement of an electronic image on video display 20. When the operator sitting in seat 16 shifts his weight in a forward direction (i.e., toward display 20), lower portion 42B of shaft 42 will be tilted in a backward direction to engage actuator arm 72B. The force exerted on actuator arm 72B by shaft 42 will overcome the spring-bias acting on closure member 72A, to move closure member 72A to a closed switch position. When the operator shifts his weight backward (i.e., away from display 20), lower portion 42B of shaft 42 will be tilted in a forward direction to engage actuator arm 68B, thereby closing switch 68 in a similar manner.

Actuator arms 70B and 74B are oriented for detecting side-to-side tilting movement of shaft 42 (i.e., along the X-axis in FIG. 1C), which is translated into corresponding movement of the electronic image on display 20. For example, when the operator sitting in seat 16 shifts his weight to the right, lower portion 42B of shaft 42 will be tilted to the left, to engage actuator arm 70B and close switch 70. When the operator shifts his weight to the left, lower portion 42B will engage actuator arm 74B to close switch 74.

If the operator shifts his weight in a direction which includes both a fore and aft (Y-axis) component and a side-to-side (X-axis) component, two of the switches 68, 70, 72, 74 will be closed. One of the closed switches will be from the group comprised of switches 68 and 72 and the other one of the closed switches will be from the group comprised of switches 70 and 74.

Switches 68, 70, 72, 74 are preferably electrical switches of the type sold by Omron Corporation under part number V-15G2-1C25-K. Each switch 68, 70, 72, 74 includes three electrical leads 80, 82 and 84. Lead 80 is a ground lead, while leads 82 and 84 are designated as "normally open" and "normally closed" leads, respectively. Therefore, only one of the two leads 82, 84 is used in connection with ground lead 80. In the preferred embodiment, the "normally open" lead 82 is selected. "Normally open" lead 82 is connected to a corresponding terminal 86 on a printed circuit board 88, which is located beneath switches 68, 70, 72 and 74, as can be best seen in FIG. 2. An elongated mounting bolt 90 couples circuit board 88 to mounting plate 76. Ground leads 80 of the four switches 68, 70, 72 and 74 are connected to a common ground terminal 92 on circuit board 88.

Referring to FIGS. 1-4, circuit board 88 includes computer circuitry for controlling the play of the video game. The computer circuitry is responsive to the closure of one or more of switches 68, 70, 72, 74 for controlling the electronic image on video game display 20 in response to the tilting movement of shaft 42. The computer circuitry may include a flight simulation program, whereby the movement of an aircraft in flight is simulated on display 20. The operator can control the flight simulation to portray climbing, descending and turning movements on display 20 by shifting his weight in seat 16. For example, when the operator shifts his weight forward to tilt seat 16 toward display 20, the display image will be tilted downwardly, to simulate aircraft descent and when the operator shifts his weight backward to tilt seat 16 away from display 20, the display image will be tilted upwardly to simulate aircraft ascent. When the operator shifts his weight to the left to tilt seat 16 to the left, the display image will be tilted to the left to simulate a left turn and when the operator shifts his weight to the right to tilt seat 16 to the right, the image will be tilted to the right to simulate a right turn. Other video programs, such as those simulating the motion of an automobile, can also be controlled using apparatus 10.

The computing circuitry is further responsive to user-controllable switches 34, 35, 36 and 37 for controlling selected parameters of the video game. For example, switch 34 may function as an "on-off" switch for selectively starting and stopping the play of the game and switch 36 may be used to select a particular video game for play. Switches 35 and 37 may be used to control selected game parameters, such as speed of movement of an image on the display and the firing rate of a simulated weapon. As can be best seen in FIGS. 1 and 3, switches 34 and 35 are coupled to respective terminals 94 and 96 on circuit board 88 by means of an electrical connector 98 and switches 36 and 37 are coupled to respective terminals 100 and 102 on circuit -board 88 by means of an electrical connector 104. Connectors 98 and 104 extend from respective handles 30 and 32, respective arms 28 and 29 and respective tubular members 25 and 26, and emerge from an opening 105 (FIG. 1C) in tubular member 27. Connectors 98 and 104 extend through a rear opening 107 (FIG. 2) in control module housing 48 for connection to circuit board 88 (FIG. 3). A third electrical connector 106 has a plug 108 at one end thereof for being electrically connected to video game console 22. An opposite end of connector 106 is coupled to terminals 110 and 112 on circuit board 88 for electrically connecting the video game control circuitry on circuit board 88 to console 22.

The operation of apparatus 10 is as follows. The operator sits in seat 16 and selects a particular video game to be played using switch 36. The selected video game is initialized using switch 34. Selected game parameters are controlled using switches 35 and 37. The movement and orientation of the electronic image on video display 20 are controlled by the operator's shifting his weight by pulling and pushing on handles 30 and 32, to impart the desired tilting motion to seat 16 and shaft 42 on which seat 16 is mounted. The tilting movement of seat 16 is detected by switches 68, 70, 72 and 74, which generate one or more discrete electrical signals indicative of the direction in which seat 16 and shaft 42 are tilted. The computer circuitry on circuit board 88 is responsive to the discrete electrical signal or signals for moving the electronic image accordingly. Seat 16 and shaft 42 can be tilted forward or backward, or laterally in either direction, relative to display 20, or a combination of forward or backward movement and lateral movement. The movement of the electronic image on video game display 20 is thus controlled by the operator's shifting his weight in the seat 16, which enhances the realism associated with the play of the video game and the enjoyment thereof.

Although the invention has been described with reference to a specific embodiment, the foregoing description is not intended to be construed in a limiting sense. Various modifications to the disclosed embodiment as well as alternative applications of the invention will be suggested to persons skilled in the art by the foregoing specification and illustrations. It is therefore contemplated that the appended claims will cover any such modifications, applications or embodiments as fall within the true scope of the invention.

What is claimed is:

1. Apparatus for controlling movement of an electronic image on a video display, comprising:
   a base member;
   a seat for supporting a human operator in a seated position;
   support means for mounting said seat for tilting movement relative to said base member, said support means including a socket member located on a bottom portion of said seat, a housing mounted on said base member, a shaft mounted for tilting movement relative to said housing, a portion of said shaft protruding from said housing for engaging said socket member to mount said seat for co-movement with said shaft, tilting movement being imparted to said seat and to said shaft by the operator shifting his weight in a direction corresponding to a desired direction of movement of the electronic image; and
   control means responsive to tilting movement of said seat for controlling movement of the electronic image.

2. The apparatus of claim 1 further including handle means adjacent said seat for being grasped by the operator to impart tilting movement to said seat.

3. The apparatus of claim 2 wherein said handle means includes first and second handles extending upwardly from said base member on respective opposite sides of said seat, whereby the operator can impart tilting movement to said seat in any desired direction by selectively pulling on and pushing against one or both of said handles.

4. The apparatus of claim 3 further including manually operable switch means located on at least one of said handles for controlling selected parameters of the electronic image.

5. The apparatus of claim 1 wherein said seat includes a foot support member projecting therefrom, to elevate the operator's feet above said base member, such that when the operator is seated in the seat, the weight of the operator is substantially completely supported by said support means.

6. The apparatus of claim 5 wherein said support means is located at a position beneath said seat corresponding to a center of gravity of said seat to maintain said seat in equilibrium when said seat is not occupied by an operator and also when said seat is occupied by an operator and the operator's center of gravity is located substantially directly above said support means.

7. The apparatus of claim 1 wherein said support means further includes:
   a resilient member concentrically disposed on a portion of said shaft located within said housing for opposing the tilting movement of said shaft, said resilient member being deformable in response to a force imparting tilting movement to said shaft and being sufficiently resilient to urge said shaft and said seat to a position of equilibrium in the absence of said force; and
   limit means located in said housing for limiting the tilting movement of said shaft and said seat.

8. The apparatus of claim 7 wherein a portion of said resilient member is beveled to provide a space within said housing for accommodating the deformation of said resilient member in response to the tilting movement of said shaft and said seat.

9. The apparatus of claim 7 wherein said limit means includes a first annular member carried on said shaft above said resilient member for engaging an inner wall of said housing when said shaft is tilted by a predetermined amount and a second annular member in concentric relation to said shaft below said resilient member and in fixed relation to said inner wall of said housing, such that an inner surface of said second annular member engages said shaft when said shaft is tilted by said predetermined amount, said first and second annular members cooperating to prevent said shaft from being tilted by more than said predetermined amount in any direction.

10. The apparatus of claim 9 wherein a peripheral surface of said first annular member is beveled to allow substantially the entire peripheral surface to contact said inner wall of said housing when said shaft is tilted by said predetermined amount.

11. The apparatus of claim 7 further including a sleeve member concentrically disposed on said shaft within said housing for co-movement with said shaft, said resilient member being interposed between said sleeve member and an inner wall of said housing.

12. The apparatus of claim 7 further including means carried in said housing to constrain the movement of said resilient member along a longitudinal axis of said shaft.

13. The apparatus of claim 1 wherein said control means includes electrical switch means responsive to a direction of tilt of said seat for generating an electrical signal indicative thereof and computing means responsive to said electrical signal for moving the electronic image accordingly.

14. The apparatus of claim 13 wherein said switch means includes a plurality of switches located with respect to said support means, such that the tilting movement of said shaft closes at least one of said switches, a discrete electrical signal being generated in response to the closure of each switch, the direction of tilt of said seat being indicated by the closure of a particular one or ones of said switches.

15. The apparatus of claim 14 wherein each of said switches has an actuator member which is biased toward an open switch position, each actuator member being depressible by pressure contact thereon by said shaft for closing the corresponding switch.

16. The apparatus of claim 1 wherein said seat is mounted for tilting movement in all directions.

17. Apparatus for controlling movement of an electronic image on a video display, comprising:
a base member;
a seat for supporting a human operator in a seated position;
support means for mounting said seat for tilting movement relative to said base member, said support means including:
a socket member located on said seat;
a housing located on said base member;
a shaft extending through a top portion of said housing for engaging said socket member to mount said seat on said base member, such that tilting movement of said seat is imparted to said shaft;
a resilient member concentrically disposed on said shaft within said housing for opposing tilting movement of said shaft, said resilient member being deformable in response to a force imparting tilting movement to said shaft and being sufficiently resilient to urge said shaft and said seat to a position of equilibrium in the absence of said force; and
limit means located in said housing for limiting the tilting movement of said shaft and said seat;
handle means adjacent said seat for being grasped by the operator in the seat to impart tilting movement to said seat by shifting the weight of the operator in any direction corresponding to a desired direction of movement of the electronic image; and
control means responsive to tilting movement of said seat for controlling movement of the electronic image accordingly.

18. The apparatus of claim 17 wherein a portion of said resilient member is beveled to provide a space within said housing for accommodating the deformation of said resilient member in response to the tilting movement of said shaft and said seat.

19. The apparatus of claim 18 wherein said limit means includes a first annular member carried on said shaft above said resilient member for engaging an inner wall of said housing when said shaft is tilted by a predetermined amount, and a second annular member in concentric relation to said shaft below said resilient member and in fixed relation to said inner wall of said housing, such that an inner surface of said second annular member engages said shaft when said shaft is tilted by said predetermined amount, said first and second annular members cooperating to prevent said shaft from being tilted by more than said predetermined amount in any direction.

20. The apparatus of claim 17 wherein said control means electronic includes electrical switch means responsive to a direction of tilt of said seat for generating an electrical signal indicative thereof and computing means responsive to said electrical signal for moving the electronic image accordingly.

21. The apparatus of claim 20 wherein said switch means includes a plurality of switches located with respect to said support means, such that the tilting movement of said seat closes at least one of said switches, a discrete electrical signal being generated in response to the closure of each switch, the direction of tilt of said seat being indicated by the closure of a particular one or ones of said switches.

22. The apparatus of claim 21 wherein each of said switches has an actuator member which is biased toward an open switch position, each actuator member being depressible by pressure contact thereon by said shaft for closing the corresponding switch.

23. Apparatus for controlling movement of an electronic image on a video display, comprising:
a base member;
a seat for a human operator;
support means for mounting said seat on said base member, said seat being mounted for tilting movement in all directions relative to said base member, said support means including:
a socket member located on said seat;
a housing located on said base member;
a shaft extending through a top portion of said housing for engaging said socket member to mount said seat with said base member, such that tilting movement of said seat is imparted to said shaft;
a resilient member concentrically disposed on said shaft within said housing for opposing tilting movement of said shaft, said resilient member being deformable in response to a force imparting tilting movement of said shaft, said resilient member being sufficiently resilient to urge said shaft and said seat to a position of equilibrium in the absence of said force; and
limit means located in said housing for limiting tilting movement of said shaft and said seat;
handle means adjacent said seat for being grasped by an operator in said seat to impart tilting movement to said seat by shifting the weight of the operator in a direction corresponding to a desired direction of movement of the electronic image; and
control means responsive to tilting movement of said seat for controlling movement of the electronic image, said control means including electrical switch means responsive to a direction of tilt of said shaft and said seat for generating an electrical signal indicative of the direction of tilt of said shaft and said seat, said control means further including computing means responsive to said electrical signal for moving the electronic image accordingly.

* * * * *